United States Patent [19]

Zones

[11] Patent Number: 5,194,235
[45] Date of Patent: Mar. 16, 1993

[54] SYNTHESIS OF SSZ-16 ZEOLITE CATALYST

[75] Inventor: Stacey I. Zones, San Francisco, Calif.

[73] Assignee: Chevron Research and Technology Company, San Francisco, Calif.

[21] Appl. No.: 936,691

[22] Filed: Aug. 27, 1992

[51] Int. Cl.$^5$ .............................................. C01B 33/34
[52] U.S. Cl. .................................................... 423/704
[58] Field of Search ................ 423/326, 328, 329, 330

[56] References Cited

U.S. PATENT DOCUMENTS

| | | | |
|---|---|---|---|
| 3,692,470 | 9/1972 | Ciric | 423/328 |
| 4,482,531 | 11/1984 | Kuehl | 423/329 |
| 4,508,837 | 4/1985 | Zones | 502/62 |

Primary Examiner—R. Bruce Breneman
Attorney, Agent, or Firm—W. K. Turner; M. L. Davis

[57] ABSTRACT

A method for preparing the zeolite SSZ-16 wherein the organic template used in the synthesis has the formula:

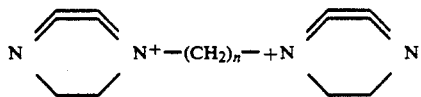

wherein n is 3, 4, or 5.

6 Claims, No Drawings

SYNTHESIS OF SSZ-16 ZEOLITE CATALYST

BACKGROUND OF THE INVENTION

1. Field of the Invention

This invention relates to a new method for synthesizing the zeolite identified as SSZ-16. More particularly, it relates to a method of making SSZ-16 using an organonitrogen template or directing molecule identified herein as DABCO-$C_n$ diquat.

2. Discussion of Relate Art

Zeolitic materials, both natural and synthetic, have been demonstrated to have catalytic properties for various types of hydrocarbon conversion. By using X-ray diffraction, certain zeolitic materials have been shown to have a crystalline structure wherein there are a large number of smaller cavities. These smaller cavities may be interconnected by a number of still smaller channels or pores. Variations in pore dimensions and shapes have been found to effect the adsorptive and catalytic properties of the zeolites. Only molecules of certain dimensions and shapes are able to fit into the pores of a particular zeolite while molecules of a larger dimension or of a different shape are unable to enter the pore in the zeolite crystals. Since the pores in the zeolite accept molecules of certain dimensions while rejecting those of a larger dimension, these zeolites have come to be known as "molecular sieves" and are utilized in a variety of ways to take advantage of these properties. These cavities and pores have been demonstrated to be of a uniform size within a specific zeolite. Because of their unique molecular sieving characteristics, as well as their potentially acidic nature, zeolites are especially useful in hydrocarbon processing as adsorbents and as catalysts for cracking, reforming, and other hydrocarbon conversion reactions.

Such molecular sieves, both natural and synthetic, include a wide variety of positive ioncontaining crystalline aluminosilicates. These aluminosilicates can be described as a rigged three-dimensional framework of $SiO_4$ and $AlO_4$ in which the tetrahedra are cross-linked through the sharing of oxygen atoms whereby the ratio of the total aluminum and silicon atoms to oxygen atoms is 1:2. The electrovalence of the tetrahedra containing aluminum is balanced by the inclusion in the crystal of a cation, for example by the inclusion of an alkali metal or an alkaline earth metal cation. This can be expressed by the relationship of aluminum to the cations, wherein the ratio of aluminum to the number of various cations, such as Ca2, Sr/2, Na, K, Cs or Li, is equal to unity. One cation may be exchanged either entirely or partially with another type of cation utilizing ion exchange techniques well know to those skilled in the art. By suitable selection of the cation, it has been possible to vary the properties of a given aluminosilicate.

Prior art techniques have resulted in the formation of a great variety of synthetic zeolites. The zeolites have come to be designated by letter or other convenient symbols, for example: zeolite A (U.S. Pat. No. 2,882,243 issued on Apr. 14, 1959 to Milton), zeolite X (U.S. Pat. No. 2,882,244 issued on Apr. 14, 1959 to Milton), zeolite Y (U.S. Pat. No. 3,130,007 Apr. 21, 1964 to Breck), zeolite ZK-5 (U.S. Pat. No. 3,247,195 issued on Apr. 19, 1966 to Kerr), zeolite ZK-4 (U.S. Pat. No. 3,314,752 issued on Apr. 18, 1967 to Kerr), and SSZ-16 (described in U.S. Pat. No. 4,508,837 issued to Zones on Apr. 2, (1985).

Typically, zeolites are prepared from reaction mixtures having sources of alkali or alkaline earth metal oxides, silica, and alumina. More recently, "nitrogenous zeolite" have been prepared from reaction mixtures containing a "template" consisting of an organic species, usually being a nitrogen compound. By varying the reaction conditions under which the zeolite is formed and the composition of the reaction mixture, different zeolites can be formed even if the same template is used. For example, zeolites ZK-4, ZSM-4, faujasite and PHI, have all been prepared from solutions containing tetramethylammonium cations.

Although most experiments reported as producing nitrogenous zeolites have used fairly simple organic template species, such as tetraalkylammonium cations or alkylenediamines, several experiments have reported using more complex organic species. U.S. Pat. No. 3,692,470, discloses preparing ZSM-10 from 1,4-dimethyl-1,4-diazoniabicyclo[2,2.2.-]octane. U.S. Pat. No. 3,832,449, Rosinski et al., Aug. 27, 1974, discloses preparing ZSM-12 from the reaction products of alkylene dihalides with complex amines or nitrogen heterocycles, U.S. Pat. No. 4,285,922, Audeh, Aug. 25, 1981, discloses preparing ZSM-5 using 1-alkyl, 4 aza, 1-azonia-bicyclo[2.2.2]-octane, 4-oxide halides.

U.S. Pat. No. 4,508,837, the entire disclosure of which is incorporated herein by reference, describes a process for making a crystalline aluminosilicate identified as SSZ-16 using as a template derivatives of organic species of 1, 4-di(lazoniabicyclo [2.2.2] octane) lower alkanes. One impediment in preparing the SSZ-16 crystalline structure for commercial use is the high cost of this organonitrogen template. It is therefore an object of this invention to provide a method for producing the zeolite SSZ-16 using a less costly template.

SUMMARY OF THE INVENTION

The present invention is directed to a method for preparing the zeolite SSZ-16. Said method comprises mixing a source of an organic nitrogen-containing compound with an oxide selected from the group consisting of aluminum oxide, gallium oxide, ferric oxide and mixtures thereof, and with an oxide selected from the group consisting of silicon oxide, germanium oxide, and mixtures thereof in water, the composition, in terms of mole ratios of oxides, falling within the following ranges:

TABLE I

|  | Broad | Preferred |
|---|---|---|
| $YO_2/W_2O_3$ | 5–350 | 10–200 |
| $M_2O/W_2O_3$ | 0.5–20 | 1–17 |
| $RO/W_2O_3$ | 0.5–40 | 5–25 |
| $OH^-/YO_2$ | >0.65 | 0.7–0.8 | wherein Y is selected from silicon, germanium, and mixtures thereof, W is selected from aluminum, gallium, iron and mixtures thereof, M is an alkali metal, preferably sodium, and R is an organic cation being designated herein as DABCO-$C_n$-diquat; maintaining the mixture at a temperature of at least 100° C. until the crystals of said zeolite are formed; and recovering said crystals.

This method is an improvement over the previous method of synthesizing SSZ-16 in that it has been found that by using this organonitrogen template the zeolite SSZ-16 may be manufactured less expensively than by methods heretofore known or used.

In producing the organonitrogen template of the invention, the halogen salt is DABCO-$C_n$-diquat is obtained by reacting two (2) molecules of diazabicyclo (2,2,2) octane (DABCO-a registered trademark of Air Products and Chemicals, Inc.) also known in the art as triethylenediamine (TED), with one (1) molecule of dihalo-n-alkane of the formula:

wherein X is a halogen and n is 3, 4, or 5. The hydroxide form of DABCO-$C_n$ diquat is prepared by converting the halogen salt of DABCO-$C_n$ diquat using methods know to those of ordinary skill in the art. When either the halogen salt or the hydroxide of DABCO-$C_n$-diquat are dissolved in an aqueous reaction mixture used to synthesize SSZ-16 zeolite, they dissociate into the cation and the respective anion. The cation has the formula:

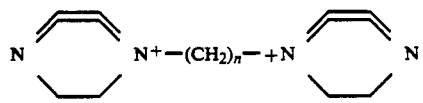

wherein n is 3, 4, or 5. This functional group is the organic template of the present invention. The anion being either the dissociated halogen or hydroxide ion of the group.

DETAILED DESCRIPTION OF THE INVENTION

The zeolite SSZ-16 composition prepared hereby can be identified, in terms of mole ratios of oxides, and in the anhydrous state, as follows:

(0.5 to 1.4)RO: (0 to 0.5) $M_2O$: $W_2O_3$: (greater than 5)$YO_2$ wherein W is selected from aluminum, gallium, iron, and mixtures thereof, Y is selected from silicon, germanium and mixtures thereof, an R is the cation described above, and M is an alkali metal cation, preferably sodium. Typically, an alkali metal hydroxide or alkali metal halide is used in the mixture; however, these components can be omitted so long as the equivalent basicity is maintained. The organic compound can provide hydroxide ion.

SSZ-16 zeolites can have a $YO_2/W_2O_3$ mole ratio greater than about 5:1. As prepared, the silica:alumina mole ratio is typically in the range of 8:1 to about 15:1. Higher mole ratios can be obtained by treating the zeolite with chelating agents or acids to extract aluminum from the zeolite lattice. The silica:alumina mole ratio can also be increased by using silicon and carbon halides and other similar compounds.

As mentioned above, the organic component of the crystallization mixture, R, is obtained by reacting two (2) molecules of diazabicyclo (2,2,2) octane (DABCO) with one (1) molecule of the dihalo-n-alkane of the formula:

wherein X is a halogen, e.g., fluorine (F), chlorine (Cl), bromine (Br) or iodine (I), preferably X is bromine or iodine, and n is 3, 4 or 5. The halogen derivative of DABCO-$C_n$-diquat may be used to introduce the organic template in the SSZ-16 synthesis and its structure, in the as-synthesized form, is as follows:

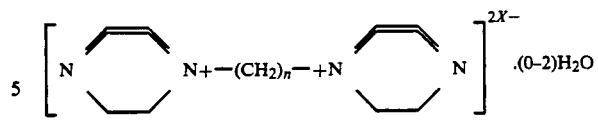

wherein X an n are as defined above. Each of the two DABCO molecules used in the synthesis of this compound has only one of its nitrogen atoms quaternized, and therefore carrying a positive charge. The halogen derivative of DABCO-$C_n$-diquat is used as the SSZ-16 synthesis template. It is soluble in water and forms a stable solution of cations having the formula:

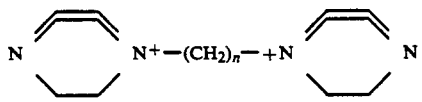

It will be apparent to those skilled in the art that the halogen form of DABCO-$C_n$-diquat can be converted into its hydroxide form by conventional ion exchange techniques, e.g., those in U.S. Pat. No. 3,140,249 and 3,140,251, the entire contents of each being incorporated herein by reference. Either the halogen or the hydroxide form of the DABCO-$C_n$-diquat can then be used in the SSZ-16 synthesis, because, as will be apparent to those skilled in the art, either of the two forms of the compound will dissociate in an aqueous solution in to the respective cations and anions.

The synthesis of the halogen salt of DABCO-$C_n$-diquat is conducted in accordance with the technique as disclosed in U.S. Pat. No. 4,482,531, the entire contents of which are incorporated herein by reference.

The DABCO-$C_n$-diquat, in its halogen or hydroxide form, is then used to synthesize SSZ-16 zeolite in the reaction mixture of Table 1.

The mixture is prepared using standard zeolitic preparation techniques. Typical sources of aluminum oxide for the reaction mixture include aluminates, alumina, aluminum compounds such as $AlCl_3$ and $Al_2(SO_4)_3$, and other zeolites as described in the commonly assigned copending application, U.S. application Ser. No. 908,680 entitled "PREPARATION OF ZEOLITES USING LOW SILICA/ALUMINA ZEOLITES AS A SOURCE OF ALUMINUM" by Y. Nakagawa and S. Zones, the disclosure of which is incorporated herein by reference.

Typical sources of silicon oxide include silicates, silica acid, colloidal silica, tetraalkyl orthosilicates, and silica hydroxides. Gallium and germanium can be added in forms corresponding to their aluminum and silicon counterparts. Salts, particularly alkali metal halides such as sodium chloride, can be added to or formed in the reaction mixture. They are known to facilitate the crystallization of zeolites while preventing silica occlusion in the lattice.

The reaction mixture is maintained at an elevated temperature until the crystals of the zeolite are formed. The temperatures during the hydrothermal crystallization step are typically maintained from about 100° C. to about 235° C., preferably from about 120° C. to about 200° C. and most preferably from about 130° C. to about 165° C. The period for the crystals to form is typically greater than 3 days and preferably from about 7 days to about 50 days.

The hydrothermal crystallization is conducted under pressure and usually in an autoclave so that the reaction mixture is subject to autogenous pressure. The reaction mixture can be stirred during crystallization.

During the hydrothermal crystallization step, the SSZ-16 crystals can be allowed to nucleate spontaneously from the reaction mixture. The reaction mixture can also be seeded with SSZ-16 crystals to both direct and accelerate the crystallization, as well as to minimize the formation of undesired alumino silicate contaminants.

Once the zeolite crystals have formed, the solid product is separated from the reaction mixture by standard mechanical separation techniques such as filtration. The crystals are water-washed and then dried, e.g., at 90° C. to 150° C. for from 8 to 24 hours, to obtain the as synthesized, SSZ-16 zeolite crystals. The drying step can be performed at atmospheric or sub-atmospheric pressures.

U.S. Pat. No. 4,508,837 discloses typical SSZ-16 X-ray diffraction patterns, its various uses, and its incorporation into other zeolites and materials.

The above description and particularly, the example below, are set forth for purposes of illustration only and are not meant to limit the invention. Many variations and modifications thereof will be apparent to those of ordinary skill in the art and can be made without departing from the spirit and scope of the invention herein described.

EXAMPLE 1

0.50 g sodium Y zeolite (obtained as Y-52 from Union Carbide Corporation) was added to 8 mL $H_2O$ 4.00 g 1M NaOH, and 5 grams of Banco sodium silicate. These components were combined in a Teflon liner of a Parr 4749 pressure reactor. Three millimoles of DABCO-$C_4$-diquat were added to the mixture and the reactor was sealed and heated for 144 hours at 150° C. with 45 rpm agitation. Upon cooling, the product was recovered by filtration and dried after several washings. The zeolite produced was determined to be SSZ-16 by X-ray diffraction.

What is claimed is:

1. A method for preparing crystalline SSZ-16 zeolite material comprising:
   (a) mixing in water a source of an organonitrogen compound, an oxide selected from the group consisting of aluminum oxide, gallium oxide, ferric oxide, and mixtures thereof, and an oxide selected from the group consisting of silicon oxide, germanium oxide, and mixtures thereof, the aqueous mixture having the following composition in terms of mole ratio of oxides:

$YO_2/W_2O_3$ = 5–350
   $M_2O/W_2O_3$ = 0.5–20
   $RO/W_2O_3$ = 0.5–40
   $OH^-/dYO_2$ = 0.65 wherein Y is silicon, germanium or mixtures thereof, W is aluminum gallium, iron and mixtures thereof, M is an alkali metal, and R is DABCO-$C_n$-diquat having the formula:

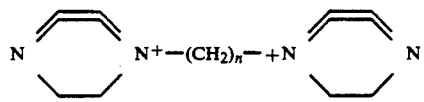

and wherein n is 3, 4, or 5;
   (b) maintaining the mixture of step "a" at a temperature of at least 100° C. until the crystals of said zeolite form; and
   (c) recovering said zeolite crystals.

2. A process in accordance with claim 1, wherein the DABCO-$C_n$-diquat is derived from the halogen salt thereof, obtained by reacting two molecules of diazabicyclo (2,2,2) octane with one molecule of dihalo-n-alkane of the formula:

3. The process in accordance with claim 2, wherein X is selected from the group consisting of fluoride, chloride, bromide, or iodide and n = 3,4, or 5.

4. The process in accordance with claim 3 wherein n = 4.

5. A process of claim 4 wherein X is bromide.

6. A process of claim 1 wherein the mixture has the following composition:

$YO_2/W_2O_3$ = 12–200
   $M_2O/W_2O_3$ = 1–17
   $RO/W_2O_3$ = 5–25
   $OH^-/YO_2$ = 0.7–0.8 wherein Y, M, W, and R are the same as in claim 1.

* * * * *

UNITED STATES PATENT AND TRADEMARK OFFICE
CERTIFICATE OF CORRECTION

PATENT NO. : 5,194,235
DATED : March 16, 1993
INVENTOR(S) : Stacey I. Zones

It is certified that error appears in the above-indentified patent and that said Letters Patent is hereby corrected as shown below:

Claim 1, Col. 6, line 9: "OH-/dYO$_2$ = 0.65" should read --OH-/YO$_2$ > 0.65--

Claim 1, Col. 6, line 11: "aluminum gallium, iron" should read --aluminum, gallium, iron--

Signed and Sealed this

Thirteenth Day of September, 1994

Attest:

BRUCE LEHMAN

Attesting Officer    Commissioner of Patents and Trademarks